E. F. PIPER.
CYLINDER FOR THRESHING AND OTHER MACHINES.
APPLICATION FILED APR. 14, 1914.
1,116,113.
Patented Nov. 3, 1914.
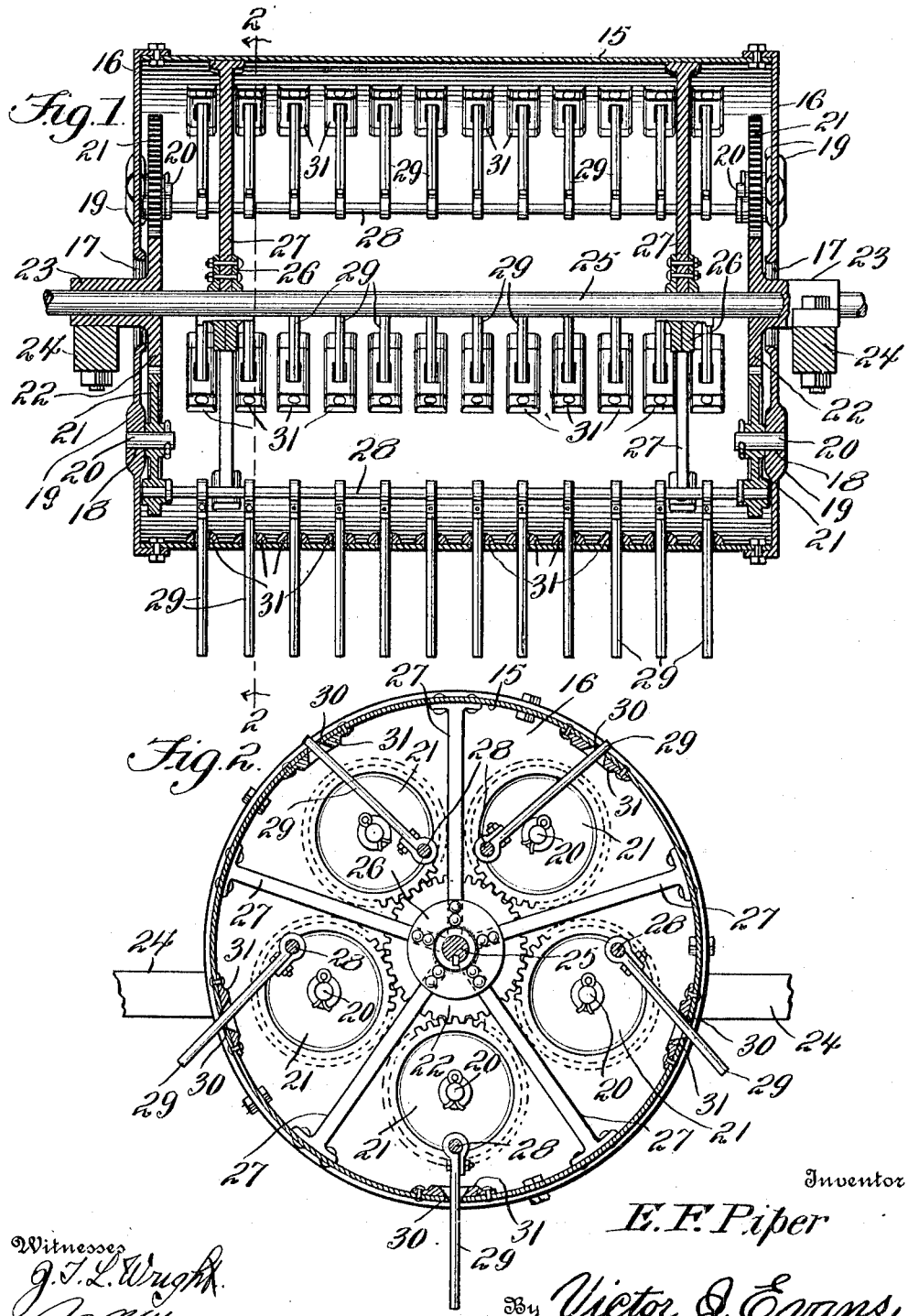

E. F. PIPER.
CYLINDER FOR THRESHING AND OTHER MACHINES.
APPLICATION FILED APR. 14, 1914.
1,116,113.
Patented Nov. 3, 1914.
2 SHEETS—SHEET 2.
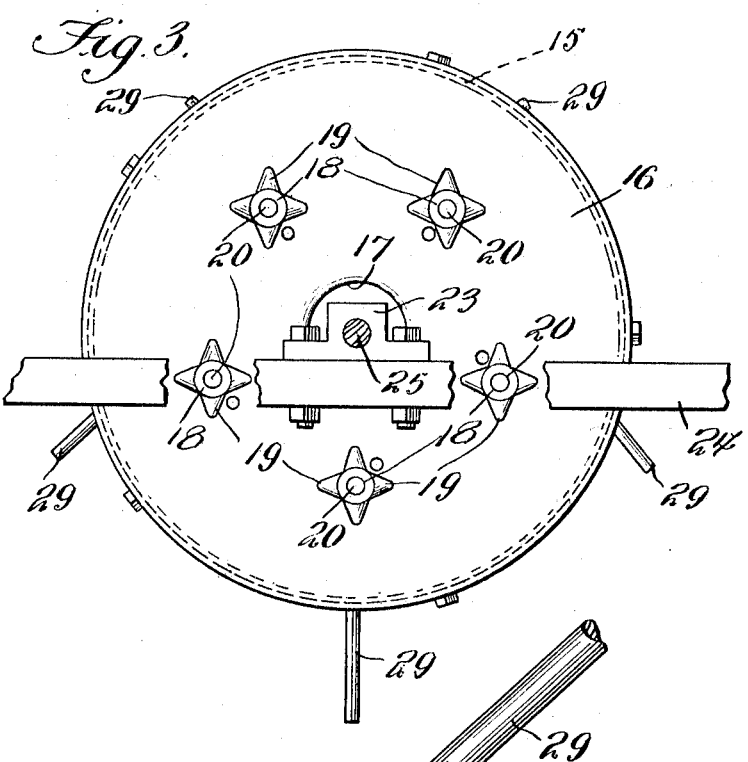
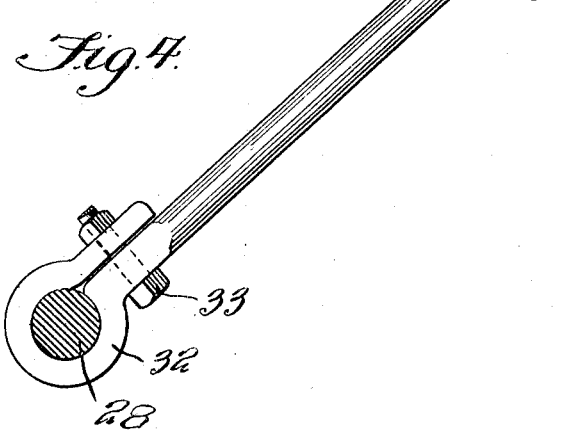
Inventor
E. F. Piper
By Victor J. Evans
Attorney

UNITED STATES PATENT OFFICE.

EDMUND F. PIPER, OF DACOTAH, MANITOBA, CANADA.

CYLINDER FOR THRESHING AND OTHER MACHINES.

1,116,113. Specification of Letters Patent. Patented Nov. 3, 1914.

Application filed April 14, 1914. Serial No. 831,884.

*To all whom it may concern:*

Be it known that I, EDMUND F. PIPER, a citizen of Canada, residing at Dacotah, in the Province of Manitoba and Dominion of Canada, have invented new and useful Improvements in Cylinders for Threshing and other Machines, of which the following is a specification.

This invention relates to cylinders or beaters for threshing and other machines, and the principal object of the invention is to produce a device of this class of simple and improved construction having movably supported teeth, said teeth being capable of being retracted within the cylinder so as to occupy but little space and to prevent possibility of the straw becoming tangled with the cylinder.

A further object of the invention is to simplify and improve the construction of the cylinder and of the means whereby the teeth are projected and retracted.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a longitudinal sectional view of a threshing machine cylinder constructed in accordance with the invention. Fig. 2 is a transverse sectional view taken on the line 2—2 in Fig. 1. Fig. 3 is an end view of the cylinder. Fig. 4 is an enlarged sectional view of one of the tooth carrying shafts, showing in elevation one of the teeth on said shaft.

Corresponding parts in the several figures are denoted by like characters of reference.

The cylinder 15 is provided with heads 16, each having a central opening 17, and each provided with a concentric series of equidistant apertures 18 reinforced, as shown at 19, and affording bearings for stub shafts 20, each carrying a spur wheel 21, said spur wheels being positioned adjacent to the inner faces of the heads 16. These spur wheels, a suitable number of which may be employed, but five of which have been shown for the purpose of illustration upon each cylinder head, are spaced apart with respect to each other, but each of the spur wheels on either cylinder head is in mesh with a centrally disposed spur wheel 22 that is formed or secured upon a box or bearing member 23 which extends through the aperture 11; the boxes or bearing members at the two ends of the cylinder being mounted on the frame of the machine, a portion of which appears at 24. The boxes 23 afford bearings for a shaft 25 which extends axially through the cylinder and which is provided with disks 26 having radially extending spokes 27 which are terminally secured externally upon the wall of the cylinder which is thus supported for rotation. The shaft 25 may be driven in any well known manner.

Corresponding spur wheels 21 on the two cylinder heads are connected together by rods or shafts 28 that extend longitudinally through the cylinder, said shafts or rods being pivoted or revolubly mounted upon the respective spur wheels. Each rod or shaft 28 carries a plurality of teeth 29 that extend through apertures 30 in the wall or casing of the cylinder, said apertures being reinforced by castings 31 secured on the inner face of the casing. The parts are so proportioned and assembled, that by the rotation of the spur wheels 21 the teeth 29 associated with the shafts carried by said spur wheels will be alternately projected and retracted. When in retracted position the teeth will lie almost entirely within the casing, while in projected position they will extend beyond the casing a sufficient distance to operate effectively upon the straw that is to be beaten for the purpose of separating the grain.

The improved cylinder may be utilized in threshing machines and separators of ordinary well known types in connection with concaves of ordinary well known construction. It is evident that teeth of relatively great strength, when extended may be used, rendering the operation correspondingly more effective, and also that the retraction of the teeth will prevent the straw from being wound thereon or tangled therewith. The cylinder may also be positioned more closely to the top or deck of the machine casing than would otherwise be possible. When the shaft 25 is rotated, it carries the cylinder around, and the spur wheels 21 having the tooth carrying rods or shafts will then be rotated by engagement with the stationary spur wheels 22 supported on the bearing members 23.

The individual teeth 29, as best seen in Fig. 4 of the drawings, may be provided with terminal clamping eyes 32 having bolts 33, whereby they may be clamped tightly upon the rods or shafts 28. These teeth may in shape be round, knife form oblong or of any other convenient or desirable shape. They may be of any dimensions and may extend laterally so as to leave no space intervening between each other (see Fig. 1) in which case they would form a continuous row of teeth or might be joined to form a flat wing or fan.

Having thus described the invention, what is claimed as new, is:—

1. A cylinder having heads, spur wheels supported for rotation on the inner faces of the heads, centrally disposed stationary spur wheels with which the first mentioned spur wheels are in mesh, tooth carrying shafts revolubly connected with corresponding spur wheels at the two ends of the cylinder, and means for supporting and rotating the cylinder; the cylinder wall being provided with apertures for the passage of the teeth.

2. A cylinder having heads provided with central openings, bearing members extending through said openings and having fixed spur wheels at their inner ends, a shaft supported in the bearings extending axially through the cylinder and having spokes supporting the cylinder, spur wheels supported for rotation on the cylinder heads in mesh with the fixed spur wheels, rods journaled in and supported by the spur wheels on the cylinder heads, and teeth associated with the rods; the cylinder being provided with apertures through which the teeth are guided.

3. A cylinder having heads provided with central openings and with reinforced apertures surrounding said central openings, stub shafts supported in the apertures and having spur wheels positioned adjacent to the inner faces of the cylinder heads, tooth carrying bars connected revolubly with said spur wheels, a driven shaft extending axially through the cylinder and having spokes supporting said cylinder, bearing members for said shaft extending through the central openings of the cylinder heads, and spur wheels fixed on said bearing members in mesh with the spur wheels carried by the stub shafts.

In testimony whereof I affix my signature in presence of two witnesses.

EDMUND F. PIPER.

Witnesses:
GORDON W. RUSSEU,
CHAS. STUBS BROWN.